United States Patent
Gaessler et al.

(10) Patent No.: US 7,418,930 B2
(45) Date of Patent: Sep. 2, 2008

(54) METHOD AND DEVICE FOR CONTROLLING VARIABLE GAS EXCHANGE VALVE IN AN INTERNAL COMBUSTION ENGINE

(75) Inventors: Hermann Gaessler, Vaihingen (DE); Juergen Schiemann, Markgroeningen (DE); Niraimathi Appavu Mariappan, Stuttgart (DE); Axel Kiefer, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/303,185

(22) Filed: Dec. 15, 2005

(65) Prior Publication Data

US 2006/0157009 A1 Jul. 20, 2006

(30) Foreign Application Priority Data

Dec. 30, 2004 (DE) .................... 10 2004 063 543

(51) Int. Cl.
*F01L 9/04* (2006.01)

(52) U.S. Cl. ............... 123/90.11; 123/90.16; 123/90.15

(58) Field of Classification Search ............. 123/90.15, 123/90.16, 90.12, 90.31, 90.11
See application file for complete search history.

(56) References Cited

U.S. PATENT DOCUMENTS

2004/0261736 A1* 12/2004 Babbitt et al. ............ 123/90.13

* cited by examiner

*Primary Examiner*—Zelalem Eshete
(74) *Attorney, Agent, or Firm*—Kenyon & Kenyon LLP

(57) ABSTRACT

A device for controlling variable gas exchange valves of an internal combustion engine is provided, in which an actuator control operates gas exchange valves by controlling valve actuators while taking into consideration supplied state variables and control specifications. Before the actuator control is cleared to operate the gas exchange valves, a collision protection device checks at least whether controlling the valve actuators using the supplied control specifications would lead to a collision of a gas exchange valve with an additional gas exchange valve. In response to a detected possible collision, the collision protection device initiates at least one measure that prevents a possible collision.

12 Claims, 5 Drawing Sheets

METHOD AND DEVICE FOR CONTROLLING VARIABLE GAS EXCHANGE VALVE IN AN INTERNAL COMBUSTION ENGINE

FIELD OF THE INVENTION

The present invention relates to a method and a device for controlling variable gas exchange valves in an internal combustion engine.

BACKGROUND INFORMATION

In the conventional internal combustion engines, gas exchange takes place via spring-loaded valves that are opened by a camshaft. The sequential operation of the valve lift, that is, the beginning and the duration of the valve opening or position of the valve tappet are determined by the shaping of the camshaft, but are generally not variable. In order to improve the efficiency of internal combustion engines, and also with regard to reducing exhaust gas, use is increasingly being made of concepts for the variable activation of gas exchange valves. For example, by changing the phase position of the camshaft, the intake and exhaust times of gas exchange valves are able to be varied. A flexible operation of an internal combustion engine is possible if the gas exchange valves are not activated by a camshaft, but are activated directly.

In engines having variable valve timing, in order to control the gas exchange, the gas exchange valves are opened and closed using electrohydraulic or electromagnetic control elements, instead of being conventionally activated via camshafts. Valve lift and valve control times are thereby able to be selected to be variable. The control of these control elements takes place as a function of various operating parameters of the engine, by software-controlled electronic control units.

In this context, appropriate actuator control signals are generated from the gas exchange valve control specifications, such as lift and control times, and taking into consideration the system state variables, such as supply voltage, combustion chamber pressure, pressure characteristics in the rail, temperatures, oil properties, etc.

In variable valve control, in contrast to a classical camshaft activation, since mechanical positive coupling is missing between camshafts and gas exchange valve, there is a danger that, in a faulty activation, a gas exchange valve collides with another gas exchange valve (a so-called "valve-valve collision," also referred to hereinafter by the acronym VVK) or with a piston of the internal combustion engine (a so-called "valve-piston collision," also referred to hereinafter by the acronym VKK). Such collisions typically lead to damage of the components, possibly including destruction of the internal combustion engine.

Thus, for instance, too great a valve lift at a point in time or at a crankshaft angle, e.g., at the time when a piston sweeps over its upper dead center OT, may have the effect that the gas exchange valve collides with the piston. Control specifications that lead to collision may be caused, for instance, by typing errors during the programming of the control specification.

For example, published German patent document DE 198 57 193 describes a method for testing the operativeness of a variable valve control, in which the combustion chamber charge is determined via the valve control. If the combustion chamber charge that has been tested by air mass measurements deviates from a setpoint value, it is concluded that there is an error in the valve control, and an error signal is generated.

Smaller deviations and errors in the valve control may thus be detected without further ado and may possibly be remedied. However, in order reliably to prevent collisions of the gas exchange valves, it is necessary in the operation of internal combustion engines having variable valve control to take further precautions.

SUMMARY

The device according to the present invention for controlling variable gas exchange valves of an internal combustion engines, in which an actuator control operates gas exchange valves by activating valve actuators, taking into consideration state variables of the internal combustion engine and control specifications, provides the advantage that, before the actuator control operates the gas exchange valves, a collision protection device checks at least whether an activation of the valve actuators using the prescribed control specifications will lead to a collision of a gas exchange valve with another gas exchange valve. If the control specifications do not lead to any collision, the control specifications are cleared to be implemented for the operation of the gas exchange valves. However, if a possible collision is recognized, the collision protection device initiates at least one measure which will prevent a possible collision.

By this procedure, it is prevented that, because of malfunction of a connected control unit or misinformation in a characteristics map, collision-causing control specifications are passed on to an actuator control and lead to collision-critical settings of the gas exchange valves.

Furthermore, it is advantageous that the collision protection device additionally checks whether a control of the gas exchange valves using the control specifications will lead to a collision with a piston of the internal combustion engine, thereby enabling a prevention of a valve-piston collision.

It is particularly advantageous if, when a possible collision is detected, the collision protection device transfers control specifications that are non-critical to a collision to the actuator control. In that way, it is possible to keep operating the internal combustion engine without resorting to a complete emergency shutdown. Further measures are possible, such as operation under emergency conditions, or a switchover to another type of operation for additional controls critical to collision.

According to the present invention, it is provided that, taking into consideration the control specifications and the state variables of the internal combustion engine, the collision protection device ascertains overshooting of the valve lift, and takes this into account upon detection of a possible collision. Thus it is possible, in an advantageous manner, to avoid collisions that come about if, based on the dynamic motion of the gas exchange valves, the lift motion goes beyond the planned setpoint value, i.e., if it overshoots.

Furthermore, it is provided that, taking into consideration the control specifications and the state variables of the internal combustion engine, the collision protection device ascertains an actual valve lift, and takes this into account upon detection of a possible collision. This procedure takes into consideration in an advantageous manner that, typically, with increasing rotary speed, the closing slope of a gas exchange valve is approaching its opening slope, so that, beginning at a certain point in time, the closing motion is already being initiated before the gas exchange valve has completed its opening motion. Because of this interrelationship, the actual lift of the gas exchange valve is reduced.

Moreover, it is advantageous that the collision protection device, while taking into consideration the control specifications and the state variables of the internal combustion engine, ascertains an increase of an opening slope and an increase of a closing slope of at least one of the two gas exchange valves, and takes these into consideration when a possible collision is detected.

In addition, it is of advantage to provide methods having the features of a collision protection device according to the present invention.

Furthermore, the collision protection device may be advantageously implemented also a computer program product having program codes, and be executed both as an actuator control device or as a test stand computer or in a development environment.

DETAILED DESCRIPTION

The present invention starts from the consideration of how to secure an unprotected, collision-endangered actuator control level against collision-critical setpoint values of superordinate levels, such as load change control or operating errors or application errors from an external source. According to the present invention, it is provided that the unprotected actuator control level should be expanded by a selected protection level, and a collision protection device or a so-called application protection is provided.

The collision protection device recognizes collision-critical control specifications in time, and, as a protective measure, prevents either collision-critical controls of the gas exchange valves, or transfers to the actuator control specification values that are not collision-critical, such as filtered or limited values.

Furthermore, it is also possible to combine the collision protection device with protective methods on other levels.

The collision protection device may be particularly helpful in the case in which sensors for the detection of the controller function are missing.

Figure 1:
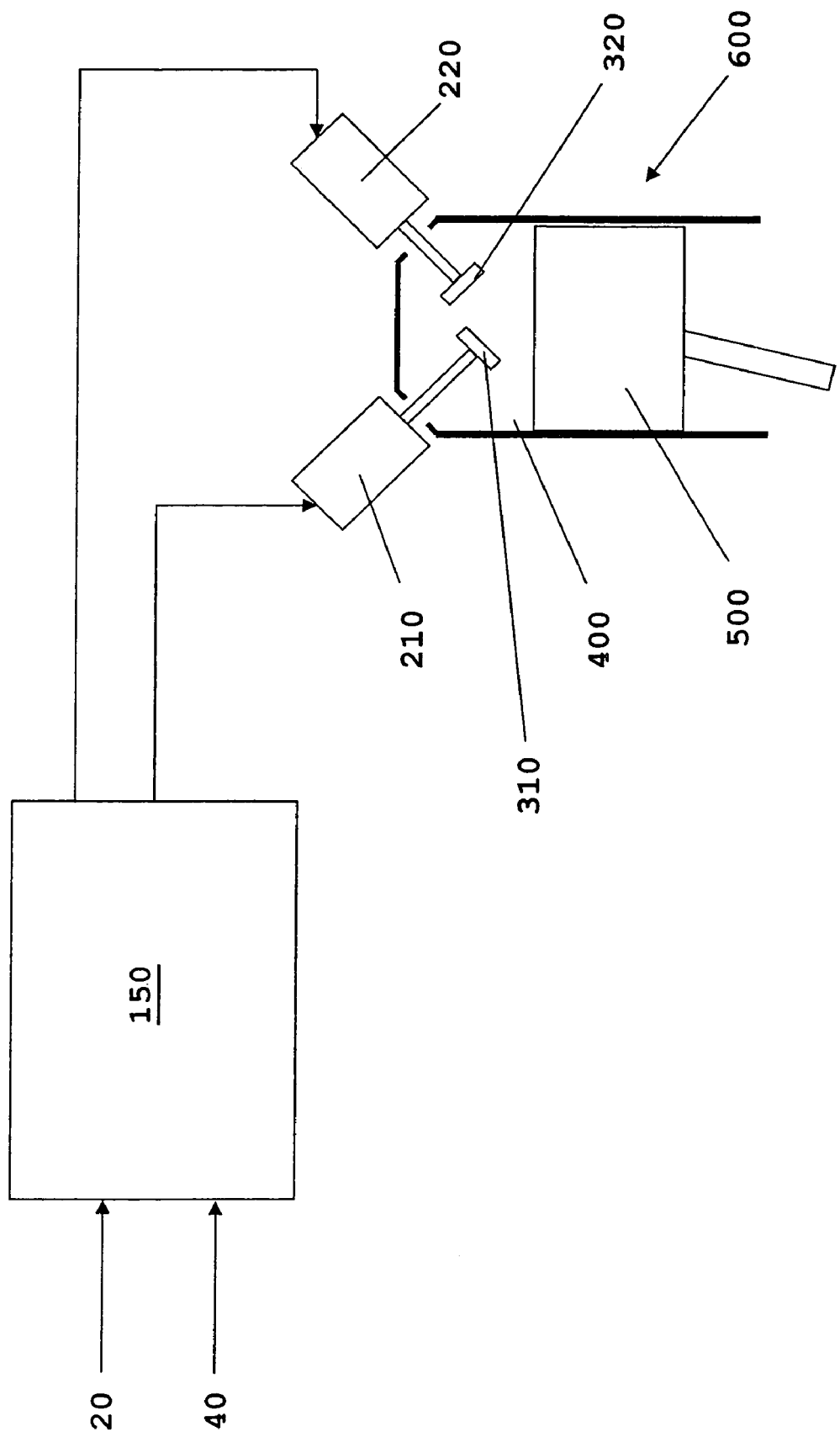
FIG. 1 shows a schematic illustration of conventional control of gas exchange valves without collision detection.

FIG. 1 shows as an example a cross section of a cylinder 600 of an internal combustion engine, having an actuator control 150 without a collision protection device. Actuator control 150, as a function of control specifications 20 and state variables 40, controls a first and a second valve actuator 210, 220, via which, in turn, a first and a second gas exchange valve 310, 320 are operated. In this connection, gas exchange valves 310, 320 extend slantwise into a combustion chamber 400 of a cylinder 600. In cylinder 600, a piston 500 is movably situated, combustion chamber 400 being limited, among other things, by piston 500 and first and second gas exchange valves 310, 320.

Figure 2:
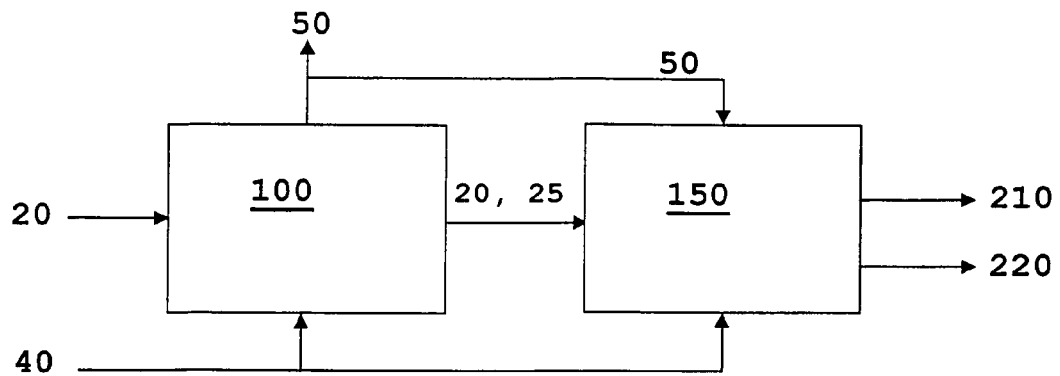
FIG. 2 shows a schematic illustration of control of gas exchange valves having collision detection in accordance with the present invention.

FIG. 2 shows collision protection device 100 according to the present invention, which is connected to actuator control 150. State variables 40 of the electrohydraulic valve actuating system, such as oil pressure, oil temperature or even of the internal combustion engine, such as engine speed, etc., are taken into consideration by both devices 100, 150 as input variables. Control specifications 20, such as lift, control times, etc., are used as an additional input variable of collision protection device 100. After being checked, control specifications 20 are then passed on by collision protection device 100 to actuator control 150, which then operates the gas exchange valves with the aid of the control specifications, possibly while taking into consideration additional input variables. If control specifications 20 are determined to be collision-noncritical, i.e., do not pose a collision danger, they are passed on essentially unchanged to actuator control 150. If, however, collision protection device 100 determines possible collision danger, i.e., the control specifications 20 are collision-critical, control specifications 20 are replaced by collision-noncritical control specifications 25. In addition, a detected collision danger may be optionally transmitted via an alarm line 50 to actuator control 150 or, if necessary, to additional components, control units, etc.

As an additional possible error reaction, it may also be provided to switch off the actuator control, the injection and/or the ignition.

Alternatively, instead of entirely replacing the collision-critical control specifications, it may also be provided that the collision-critical control specifications be adjusted in such a way that collision-noncritical control specifications are attained.

The real, complex gas exchange valve lift characteristics, e.g., opening, overshooting, holding, closing or braking, are modeled in collision protection device 100 for the collision calculation by using simpler envelope curves that are calculable in real time, e.g., trapeze-shaped envelope curves. The parameters of the gas exchange valve model curves are determined by the specification values, as well as by controller features that are suitably evaluated and filed in characteristics maps. Overshooting lift proportions, as well as speed in opening and closing the gas exchange valves, come into consideration as controller features.

The resulting collision-critical proportions of the piston motion in the direction of the valve motion axes are described by corresponding piston stroke model curves, taking into consideration the geometrical relationships, e.g., valve inclination angles, cylinder head sealing, piston recess (which is defined as the measure of the piston head or piston top to the cylinder's upper edge, at top dead center), and piston contour, by corresponding piston stroke model curves.

Figure 3:
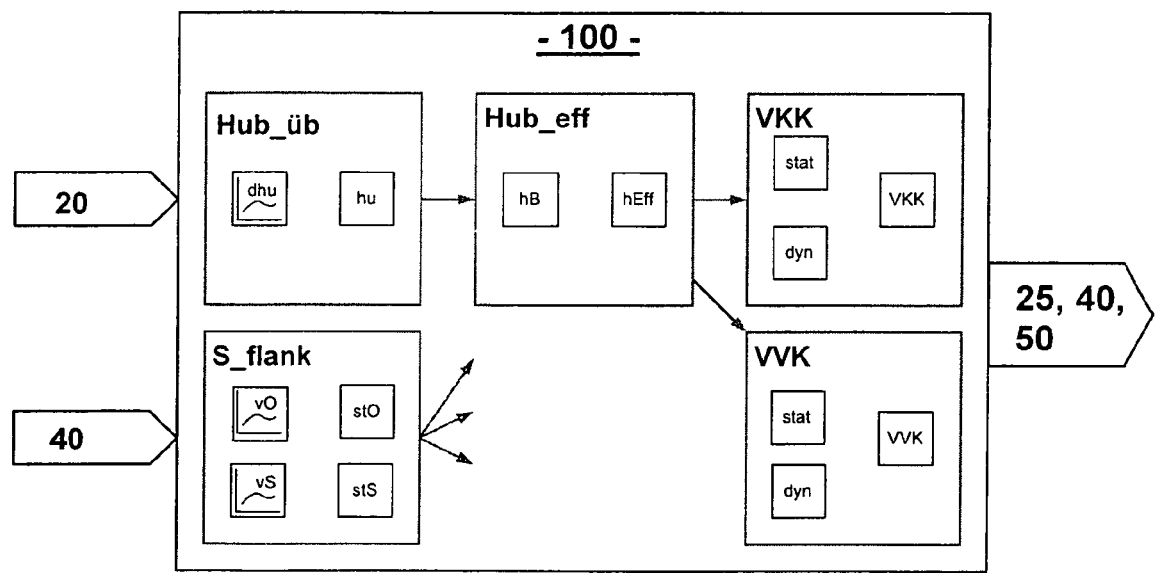
FIG. 3 shows a schematic illustration of an example embodiment of the collision detection device according to the present invention.

FIG. 3 schematically illustrates an example embodiment of collision protection device 100 according to the present invention. As was described in connection with FIG. 2, control specifications 20 and state variables 40 are recorded as input variables, and state variables 40, collision-noncritical control specifications 25 or tested control specifications 20 as well as alarm reports are emitted via an alarm line 50 as output variables. Collision protection device 100 includes five modules: an overshoot stroke module Hub_üb, slope increase module S_slope, effective stroke module Hub_eff, valve-piston collision detection module VKK and a valve-valve collision detection module VVK. In the light of the input variables control specifications 20 and state variables 40, controller features of the gas exchange valves are now ascertained in the individual modules.

In overshoot stroke module Hub_üb there is ascertained how far the stroke will overshoot the stroke to be controlled, based on the dynamic control procedure, and which maximum stroke, a so-called overshoot stroke hu, will be attained. This overshoot stroke hu is ascertained from a stroke dynamics characteristics map dhu, starting from the input variables and possibly from additional variables.

In the subsequent effective stroke module Hub_eff, while taking into consideration a valve stroke characteristics map hb, from these data, together with the input variables, an effective stroke $h_{Ef}$ is determined. In this connection, the effective stroke module takes into consideration that, with increasing engine speed, the opening and closing times of a gas exchange valve typically approach each other. Beginning at a certain engine speed, it may happen that the closing procedure of the gas exchange valves is initiated even before the gas exchange valve has attained a predefined lift.

Slope increase module S-slope, in the light of a gas exchange valve opening characteristics map vO or a closing characteristics map vS, while taking into consideration the input variables, ascertains the increases of the opening slope stO and the closing slope stS, and makes these variables available to the remaining modules for further processing.

Valve-piston collision detection module VKK and valve-valve collision detection module VVK now calculate, with the aid of the ascertained data of the remaining modules, possible valve-piston collisions or valve-valve collisions, while taking into consideration dynamic (dyn) and static (stat) models.

Figure 4:
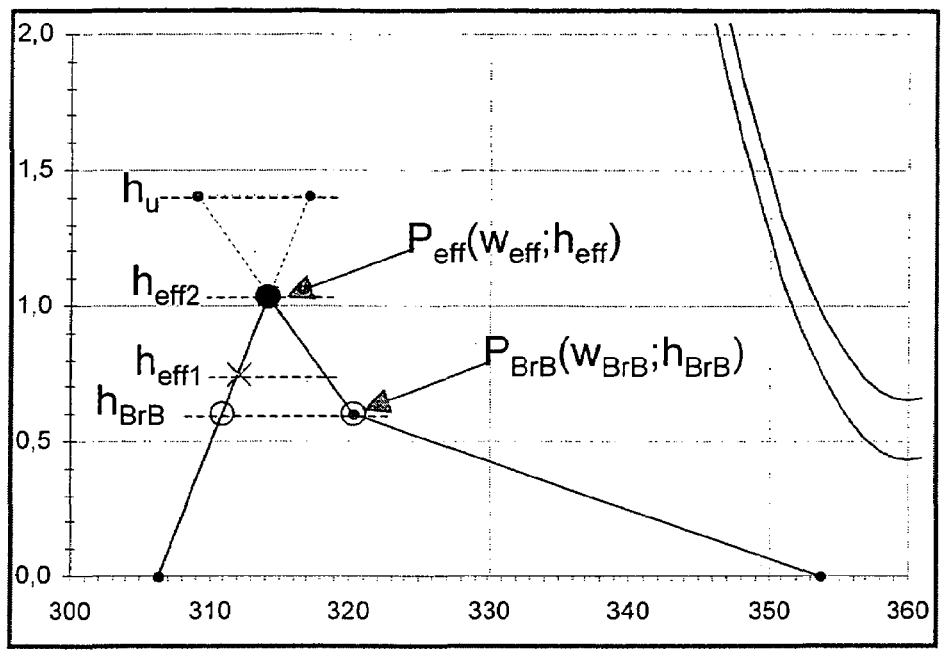
FIG. 4 shows a graph illustrating a determination of an effective lift, in accordance with the present invention.

In FIG. 4, in exemplary fashion, different effective lifts $h_{eff1,2}$ are shown, which are taken into consideration by effective lift model Hub-eff. In the lift-crankshaft angle diagram, the opening slope of a gas exchange valve is drawn in, beginning with a crankshaft angle of approximately 306°. If no closing motion of the gas exchange valve is initiated, the gas exchange valve would attain its predefined lift at approximately 318°: in the diagram, this is designated as overshoot lift hu. Since, however, in the example shown, a closing procedure of the gas exchange valve is initiated at approximately 308°, before the predefined lift (here hu) is attained, the gas exchange valve does not attain the predefined lift (hu) any more, and goes over from the opening motion directly to a closing motion.

It is further shown in the diagram of FIG. 4 that, in the further course, the closing slope becomes flatter beginning at a braking point $P_{BrB}$, at a braking angle $W_{BrB}$ and a braking stroke $h_{BrB}$. At approximately 355° crankshaft angle, the gas exchange valve is then closed.

The point at which the actual closing motion of the gas exchange valve sets in may be determined by modeling from the intersection of the opening slope and the closing slope as the effective lift inversion point $P_{eff}$, characterized by an effective crankshaft angle $W_{eff}$ and an effective lift $h_{eff}$.

Now, different points in time, at which the closing procedure of the gas exchange valve is initiated, may be provided for different engine speeds, whereby, in turn, different effective valve lifts $h_{eff}$ set in. In FIG. 4, for example, three possible effective lifts are denoted by $h_{eff1}$, $h_{eff2}$ and $h_{BrB}$, in response to an effective lift having the magnitude $h_{BrB}$, the beginning of the closing motion already being influenced by the valve brake.

Figure 5:
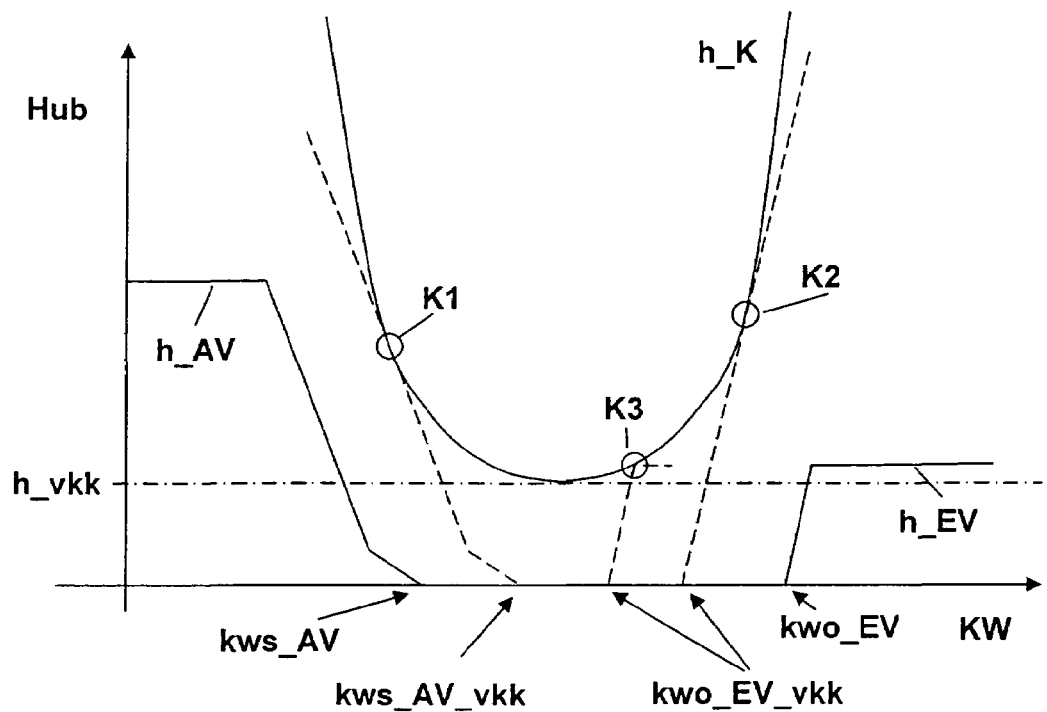
FIG. 5 shows a graph illustrating a valve-piston collision.

In FIG. 5, the curves of the lifts of exhaust valve h_AV and intake valve h_EV, as well as of the piston h_k, are plotted against the crankshaft angle. The exhaust valve is first shown as open, and then closes at a constant increase of the closing slope. Shortly before the end of closing of the exhaust valve, in the example shown, the valve brake takes effect and decelerates the closing procedure, whereby the increase in the closing slope flattens out. At an exhaust valve cam angle kws_AV the gas exchange valve is closed. Exhaust valve lift curve h_AV, shown by a solid line, has no contact or intersection with piston stroke curve hK, and, consequently, a collision of the exhaust valve with the piston is not to be expected. However, if the closing end kws_AV of the gas exchange valve is shifted towards late, that is, in the direction of piston stroke curve h_K, the closing slope of exhaust valve lift curve h_AV touches piston stroke curve h_k at a collision point K1, at a collision-critical exhaust valve closing angle kws_AV_vkk. The corresponding collision-critical closing slope is represented by a dashed line in FIG. 5. For all exhaust valve closing angles that are greater than or equal to the collision-critical exhaust valve closing angle kws_AV_vkk, a collision is to be expected between exhaust valve and piston 500.

This analysis applies similarly to the intake valve. An opening of the intake valve is shown by a solid line, at an intake valve opening angle kwo_EV, which, in the example shown, lies after the upper dead center of the piston. Since the intake valve lift curve h_EV does not intersect with piston stroke curve h_K, no valve-piston collision is to be expected. In response to a shifting of intake opening angle kwo_EV towards early, however, the danger of a valve collision increases. In a simple analysis, if only the increase in the opening slope is taken into consideration, a corresponding tangent, here shown as a dashed line, intersects with piston stroke curve h_K at a collision point K2. Since, however, the intake valve, in the example shown, lies below this possible collision point K2, collision point K2 is not relevant. Taking into consideration the slope increase and the lift, collision-critical intake valve opening angle kwo_EV_vkk shifts to an earlier crankshaft angle, the collision-critical intake valve lift curve, shown as a dashed line, intersects with piston stroke curve h_K at collision point K3. For all valve lifts that have the same lift and the same slope increase, one has to reckon with an intake valve-piston collision in the case of intake opening angles kwo_EV which are smaller than or equal to the collision-critical intake valve opening angle kwo_EV_vkk. Gas exchange valve lifts that are smaller than the valve-piston clearance, that is shown by the dotted dashed line, do not reach piston 500 and are collision-noncritical.

Furthermore, in the modules for collision detection, it is provided to detect collisions in the light of a so-called geometrical analysis. Intake valves and exhaust valves are mostly built into the cylinder head (ZK) in such a way (inclined) that, beginning at certain lifts, they are able to touch each other.

Valve-valve collisions (VVK) are possible between the inner valve head edge points. It is also possible that a valve hits the other valve, that has already been extended, for instance, on the shaft or on the inner valve head edge.

In order to avoid this, the strategy of the "dedicated return path" is applied. An extended valve must not be hindered during the return to its seat. In this context, the surface stretched out in the XY plane by the valve lift, between the valve at rest and the extended valve, is kept free, that is, it must not be touched by the valve head surface of the other valve that has a lesser lift. Thus, the collision analysis is reduced to the point of intersection of the valve head edge straight line.

Figure 6:
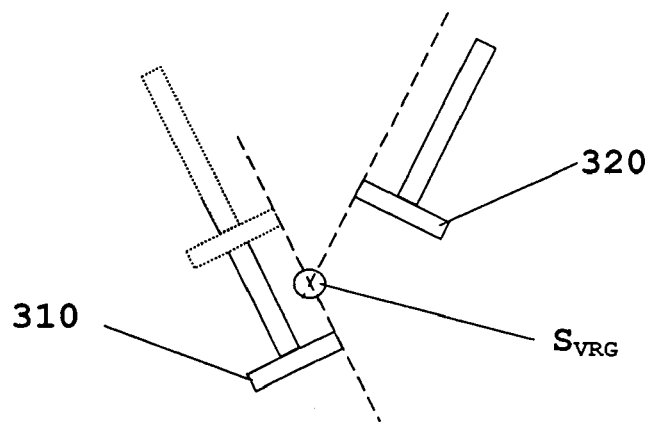
FIG. 6 illustrates a valve overlap without a valve-valve collision.

As shown in FIG. 6, the inner valve edge straight lines (shown as a dashed line) touch at intersection $S_{VRG}$. The corresponding valve lifts are defined as lift limits $h_{fAVV}$, $h_{fEVV}$, as valve-valve clearances.

Then, a collision takes place if both valves are extended so far that the point of intersection is at least touched (lift limit exceeding) and consequently satisfies the static collision criterion:

$$h_{AV} \geq h_{fAVV} \wedge h_{EV} \geq h_{fEVV}$$

Figure 7:
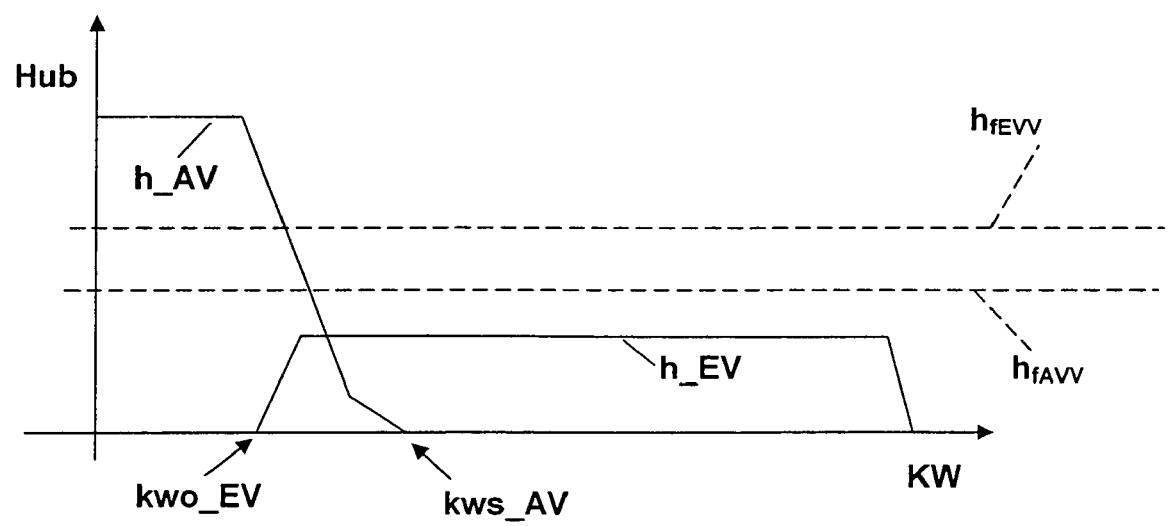
FIG. 7 shows a graph illustrating a valve overlap with a valve-valve collision.

FIG. 7 schematically illustrates in a graph the quantities involved in a valve-valve collision analysis. Opening angle kwo_EV of the intake valve lies, in this case, for example, before closing angle kws_AV of the exhaust valve, and thus there is a so-called valve overlap. In a valve overlap, there exists the danger that valve-valve collisions may occur.

A collision-noncritical case is represented in FIG. 7. Two dashed lines characterize the collision-critical valve-valve clearances $h_{fAVV}$ and $h_{fEVV}$. What is determining for a possible danger of collision of the gas exchange valves is whether, in the case of a valve overlap, the points of intersection of the two valve lift curves h_AV, h_EV lie above or below the collision-critical valve-valve clearances $h_{fAVV}$, $h_{fEVV}$. It is true that, in the example shown, valve lift h_AV of the exhaust valve goes beyond clearance $h_{fAVV}$, but the point of intersection with intake valve lift curve h_EV lies below the collision-critical clearance $h_{fEVV}$, and thus there is no danger of a valve-valve collision.

A prerequisite for the dynamic valve-valve collision conclusion is that the threshold criterion is satisfied, i.e., an exceeding of the lift limit. Furthermore, a VVK is present only if the parts of the two lift curves, which go beyond the lift limits, overlap (dynamic collision criterion). The overlapping is checked using lift limit exceeding angle (wGr). The latest limiting angle of the opening slopes (wOGr) and the earliest limiting angle of the closing slopes are compared to each other. A VVK is only possible if both valve lifts at least exceed the respective valve-valve clearance values $h_{fEVV}$, $h_{fAVV}$ (static VVK basic condition). Furthermore, a VVK is present only if both valve lift model curves overlap so simultaneously that, in this context, the respective clearance values $h_{fEVV}$, $h_{fAVV}$ are at least exceeded.

Figure 8:
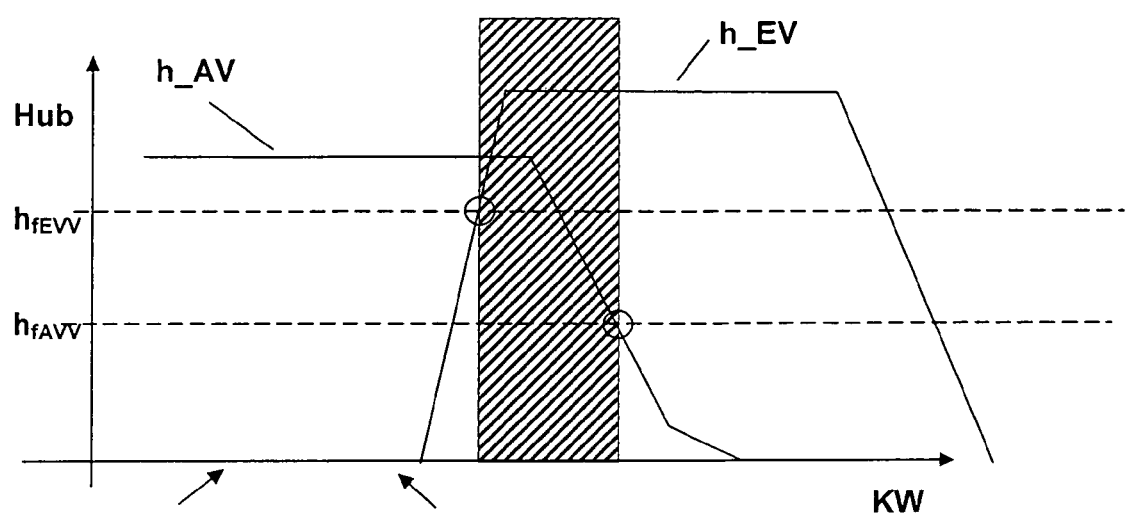
FIG. 8 shows a graph illustrating geometrical consideration of the valve-valve collision.

In the example shown in FIG. 8, in the hatched area, the respective VVK clearance limits of both valves are simultaneously exceeded. The limit angles may be determined, for example, by the following relationship:

$$wO_{Gr} = \max\left(wO_{bAV} + \frac{hf_{AVV} - hu_{effAV}}{stO_{AV}}; wO_{beV} + \frac{hf_{EVV} - hu_{effEV}}{stO_{EV}}\right)$$

$$wS_{Gr} = \min\left(wS_{eAV} - \frac{hf_{AVV} - hu_{effAV}}{stS_{AV}}; wS_{eEV} + \frac{hf_{EVV} - hu_{effEV}}{stS_{EV}}\right)$$

Valve-valve collision may be expected if the earliest limit angle of the closing slopes is greater than the latest angle of the opening slopes: $wO_{Gr} \leq wS_{Gr}$.

What is claimed is:

1. A device for controlling variable gas exchange valves of an internal combustion engine, comprising:
    an actuator controller for operating a first gas exchange valve and a second gas exchange valve by controlling a first valve actuator of the first gas exchange valve and a second valve actuator of the second gas exchange valve, wherein, in controlling the first and second valve actuators, the actuator controller takes into consideration state variables of the internal combustion engine and a predetermined control specification for the actuator controller; and
    a collision protection device that is operatively connected to the actuator controller and that ascertains, before the actuator controller operates the first and second gas exchange valves, whether controlling the first and second valve actuators using at least the predetermined control specification will lead to a possible collision between the first and second gas exchange valves, wherein, if the possible collision is ascertained, the collision protection device initiates at least one measure that prevents the possible collision;
    wherein the collision protection device takes an ascertained increase in an opening slope and an increase in a closing slope of at least one of the first and second gas exchange valves into consideration when the possible collision is detected between the first and second gas exchange valves.

2. The device as recited in claim 1, wherein the collision protection device additionally ascertains, before the actuator controller operates the first and second gas exchange valves, whether controlling the first and second gas exchange valve actuators using at least the predetermined control specification will lead to a possible collision between a piston of the internal combustion engine and at least one of the first and second gas exchange valves.

3. The device as recited in claim 1, wherein, in response to the possible collision between the first and second gas exchange valves, the collision protection device transmits an alternate control specification to the actuator control that would prevent the possible collision.

4. The device as recited in claim 2, wherein, in response to the possible collision between the piston of the internal combustion engine and at least one of the first and second gas exchange valves, the collision protection device transmits an alternate control specification to the actuator control that would prevent the possible collision.

5. The device as recited in claim 1, wherein the collision protection device, while taking into consideration the predetermined control specification and the state variables of the internal combustion engine, ascertains lift overshooting values for the first and second gas exchange valves and takes the lift overshooting values into consideration upon detecting the possible collision between the first and second gas exchange valves.

6. The device as recited in claim 2, wherein the collision protection device, while taking into consideration the predetermined control specification and the state variables of the internal combustion engine, ascertains lift overshooting values for the first and second gas exchange valves and takes the lift overshooting values into consideration upon detecting the possible collision between the piston of the internal combustion engine and at least one of the first and second gas exchange valves.

7. The device as recited in claim 1, wherein the collision protection device, while taking into consideration the predetermined control specification and the state variables of the internal combustion engine, ascertains an effective lift value for the first and second gas exchange valves and takes the effective lift value into consideration upon detecting the possible collision between the first and second gas exchange valves.

8. The device as recited in claim 2, wherein the collision protection device, while taking into consideration the predetermined control specification and the state variables of the internal combustion engine, ascertains an effective lift value for the first and second gas exchange valves and takes the effective lift value into consideration upon detecting the possible collision between the piston of the internal combustion engine and at least one of the first and second gas exchange valves.

9. A device for controlling variable gas exchange valves of an internal combustion engine, comprising:
- an actuator controller for operating a first gas exchange valve and a second gas exchange valve by controlling a first valve actuator of the first gas exchange valve and a second valve actuator of the second gas exchange valve, wherein, in controlling the first and second valve actuators, the actuator controller takes into consideration state variables of the internal combustion engine and a predetermined control specification for the actuator controller; and
- a collision protection device that is operatively connected to the actuator controller and that ascertains, before the actuator controller operates the first and second gas exchange valves, whether controlling the first and second valve actuators using at least the predetermined control specification will lead to a possible collision between the first and second gas exchange valves, wherein, if the possible collision is ascertained, the collision protection device initiates at least one measure that prevents the possible collision;
- wherein the collision protection device, while taking into consideration the predetermined control specification and the state variables of the internal combustion engine, ascertains an increase in an opening slope and an increase in a closing slope of at least one of the first and second gas exchange valves, and wherein the collision protection device takes the ascertained increase in the opening slope and the increase in the closing slope into consideration when the possible collision is detected between the first and second gas exchange valves.

10. A device for controlling variable gas exchange valves of an internal combustion engine, comprising:
- an actuator controller for operating a first gas exchange valve and a second gas exchange valve by controlling a first valve actuator of the first gas exchange valve and a second valve actuator of the second gas exchange valve, wherein, in controlling the first and second valve actuators, the actuator controller takes into consideration state variables of the internal combustion engine and a predetermined control specification for the actuator controller; and
- a collision protection device that is operatively connected to the actuator controller and that ascertains, before the actuator controller operates the first and second gas exchange valves, whether controlling the first and second valve actuators using at least the predetermined control specification will lead to a possible collision between the first and second gas exchange valves, wherein, if the possible collision is ascertained, the collision protection device initiates at least one measure that prevents the possible collision;
- wherein the collision protection device additionally ascertains, before the actuator controller operates the first and second gas exchange valves, whether controlling the first and second gas exchange valve actuators using at least the predetermined control specification will lead to a possible collision between a piston of the internal combustion engine and at least one of the first and second gas exchange valves;
- wherein the collision protection device, while taking into consideration the predetermined control specification and the state variables of the internal combustion engine, ascertains an increase in an opening slope and an increase in a closing slope of at least one of the first and second gas exchange valves, and wherein the collision protection device takes the ascertained increase in the opening slope and the increase in the closing slope into consideration when the possible collision is detected between the piston of the internal combustion engine and at least one of the first and second gas exchange valves.

11. A method for preventing a collision event involving at least one variable gas exchange valve of an internal combustion engine, comprising:
- performing, using an actuator controller, a control operation of a first valve actuator for a first gas exchange valve and a second valve actuator for a second gas exchange valve as a function of a predetermined control specification and state variables of the internal combustion engine;
- ascertaining, before performing the control operation of the first and second valve actuators, whether controlling the first and second valve actuators using at least the predetermined control specification will lead to at least one of: a) a possible collision between the first and second gas exchange valves; and b) a possible collision between a piston of the internal combustion engine and at least one of the first and second gas exchange valves; and
- initiating, in response to the ascertained possible collision, at least one preventive measure to prevent the possible collision;
- ascertaining, while taking into consideration the predetermined control specification and the state variables of the internal combustion engine, an increase in an opening slope and an increase in a closing slope of at least one of the first and second gas exchange valves, and taking the ascertained increase in the opening slope and the increase in the closing slope into consideration when the possible collision is detected between the first and second gas exchange valves.

12. A computer-readable storage medium for storing a computer program that controls, when executed by a computer, a method for controlling variable gas exchange valves of an internal combustion engine, the method comprising:
- performing, using an actuator controller, a control operation of a first valve actuator for a first gas exchange valve and a second valve actuator for a second gas exchange valve as a function of a predetermined control specification and state variables of the internal combustion engine;
- ascertaining, before performing the control operation of the first and second valve actuators, whether controlling the first and second valve actuators using at least the predetermined control specification will lead to at least one of: a) a possible collision between the first and second gas exchange valves; and b) a possible collision between a piston of the internal combustion engine and at least one of the first and second gas exchange valves; and
- initiating, in response to the ascertained possible collision, at least one preventive measure to prevent the possible collision;
- ascertaining, while taking into consideration the predetermined control specification and the state variables of the internal combustion engine, an increase in an opening slope and an increase in a closing slope of at least one of the first and second gas exchange valves, and taking the ascertained increase in the opening slope and the increase in the closing slope into consideration when the possible collision is detected between the first and second gas exchange valves.

* * * * *